(12) United States Patent
Hudson et al.

(10) Patent No.: US 9,285,583 B2
(45) Date of Patent: Mar. 15, 2016

(54) ADJUSTABLE MIRROR MOTOR MOUNTING FOR LASER PRINTHEAD

(71) Applicant: Lexmark International Inc., Lexington, KY (US)

(72) Inventors: Randall L. Hudson, Richmond, KY (US); Jason Lee Rowe, Richmond, KY (US)

(73) Assignee: Lexmark International, Inc., Lexington, KY (US)

(*) Notice: Subject to any disclaimer, the term of this patent is extended or adjusted under 35 U.S.C. 154(b) by 382 days.

(21) Appl. No.: 13/731,859

(22) Filed: Dec. 31, 2012

(65) Prior Publication Data

US 2014/0185118 A1 Jul. 3, 2014

Related U.S. Application Data

(60) Provisional application No. 61/659,410, filed on Jun. 13, 2012.

(51) Int. Cl.
*G02B 26/08* (2006.01)
*G02B 26/12* (2006.01)

(52) U.S. Cl.
CPC .......... *G02B 26/123* (2013.01); *G02B 26/121* (2013.01)

(58) Field of Classification Search
CPC ..... G02B 26/121; G02B 26/123; G02B 26/10
USPC ............... 359/200.1–200.2, 203.1–204.5, 359/212.1–219.2, 220.1–221.4, 359/225.1–226.2; 347/138, 232–233, 347/242–243, 259–261, 263
See application file for complete search history.

(56) References Cited

U.S. PATENT DOCUMENTS 8,780,158 B2 * 7/2014 Hudson et al. ............... 347/245

* cited by examiner

*Primary Examiner* — James Phan

(57) ABSTRACT

A scan unit printhead of an imaging device having an adjustable mirror mounting. The scan unit includes a housing to which a rotatable minor, one or more light sources and an optical assembly are secured. The scan unit also includes a motor for driving the rotatable mirror, a plurality of fasteners for securing the motor to the housing and a plurality of spacers interposed between a base associated with the motor and the housing. The plurality of spacers resiliently bias the base of the motor away from the housing such that each of the plurality of spacers allows relative adjustment of a space between the base of the motor and the housing during a tightening and loosening operation of at least one of the to plurality of fasteners.

17 Claims, 5 Drawing Sheets

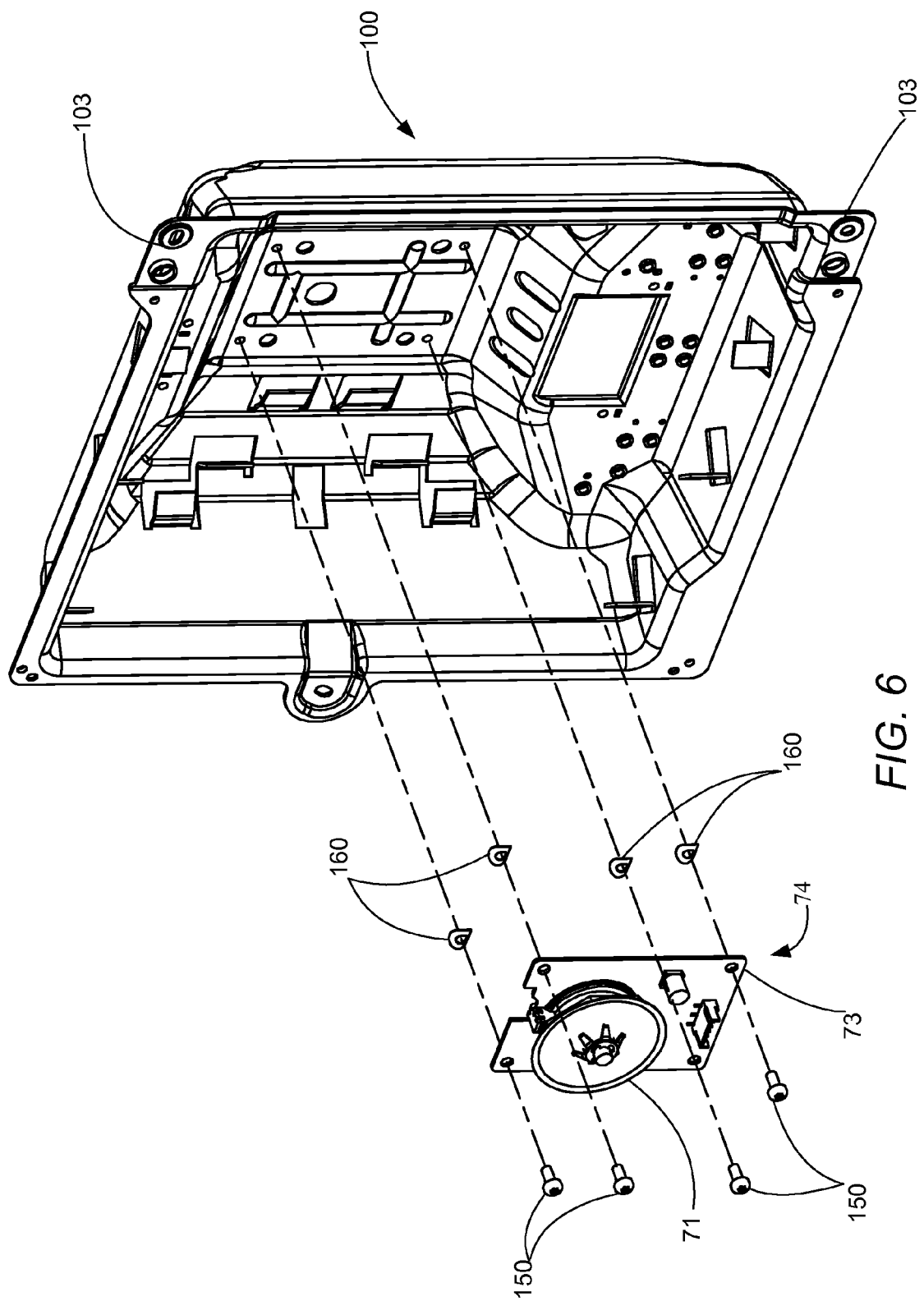

ADJUSTABLE MIRROR MOTOR MOUNTING FOR LASER PRINTHEAD

CROSS REFERENCES TO RELATED APPLICATIONS

The present application is related to and claims priority from U.S. patent application Ser. No. 61/659,410, filed Jun. 13, 2012, entitled, "Adjustable Mirror Motor Mounting for Laser Printhead," and the present application is related to U.S. patent application Ser. No. 13/250,157, filed Sep. 30, 2011, now U.S. Pat. No. 8,780,158, entitled, "Laser Scan Unit Housing for an Imaging Device." The contents of these applications are incorporated by reference herein in their entirety.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

Example embodiments of the present disclosure relate generally to a laser scan unit for an image scanning device, and more particularly to an adjustable minor motor mounting for a laser scan unit.

2. Description of the Related Art

Multibeam and single beam laser scanners typically include a housing for holding the scanner's optical components that is constructed from a thermoplastic. Such thermoplastic housings disadvantageously shrink non-uniformly during the molding and subsequent cooling process in the manufacture of the housing. The inconsistencies associated with the molding and cooling of these parts creates two primary issues.

First, part-to part dimensional variation of features for mounting sensitive optical components, such as mirrors and lenses, creates the need for assembly adjustment mechanisms during production as well as for additional components. Second, during normal operation of electrophotographic printers, the fuser assembly, the laser scanner motor and other printer components and assemblies may create heat. As the thermoplastic housing heats, it expands thermally at two different coefficient of expansion based rates: parallel to the flow and fiber direction of the plastic during injection molding, and perpendicular to the flow and fiber direction of the plastic. The complex shape and features of the housing design, with a multitude of flow disruptions and directions, do not expand uniformly when heated, causing the part to warp or change shape along with the absolute expansion of the housing. This change of size and shape of the housing, which locates the critical laser pointing and focal elements, creates print quality issues associated with change of spot size and location of the laser image on the photoconductive drum, primarily color to color registration of the four color planes (CMYK).

One possible alternative to address the above-mentioned issues is having the housing formed from a metal. However, one of the challenges to the use of a metal housing is the fairly large tolerance that needs to be allowed. For example, the accepted industry norm for boss heights in drawn metal is significantly higher as compared to one constructed from thermoplastic: 0.250 mm for drawn metal vs. 0.05 mm for plastic over a 40 mm width. Tolerances associated with mirror motor mounting and planarity relative to the metal housing and the rest of the optical components are relatively important because the mirror motor is very early in the optical path of a laser scanner such that any error is magnified significantly at the end of the optical path. For example, any angular error is doubled because it is a mirror.

Based upon the foregoing, a need exists for an improved laser scan unit for an imaging device.

SUMMARY

Example embodiments of the present disclosure overcome shortcomings of prior laser scan units and thereby satisfy a need for a laser scan unit having an adjustable mirror mount to compensate for part-to-part variation. According to an example embodiment, a scan unit for an imaging device includes a housing to which a rotatable minor, one or more light sources and an optical assembly are secured. The scan unit may include a motor assembly for driving the rotatable mirror, the motor assembly having a motor and a base, and a plurality of fasteners for securing the base of the motor to the housing. The scan unit may further include a plurality of spacers interposed between the base of the motor assembly and the housing, the plurality of spacers resiliently biasing the base, and hence the motor, away from the housing. Each of the plurality of spacers allows relative adjustment of a space between the base and the housing during a tightening and loosening operation of at least one of the plurality of fasteners.

The scan unit may include a reference datum plane established by a plurality of planar features formed on the housing, wherein each of the plurality of spacers allows relative adjustment of each of the plurality of fasteners to adjust the planarity of a surface of the rotatable mirror with respect to the reference datum plane.

The spacers may have an annular shape and include an outer edge undulating in a circumferential direction. The spacers may generally be a spring washer and particularly, one to of a Belleville washer and a wave washer.

BRIEF DESCRIPTION OF THE DRAWINGS

The above-mentioned and other features and advantages of the various embodiments, and the manner of attaining them, will become more apparent and will be better understood by reference to the accompanying drawings.

FIG. 6 is an partial, exploded, perspective view of the scan unit printhead of FIG. 3.

DETAILED DESCRIPTION

Figure 1:
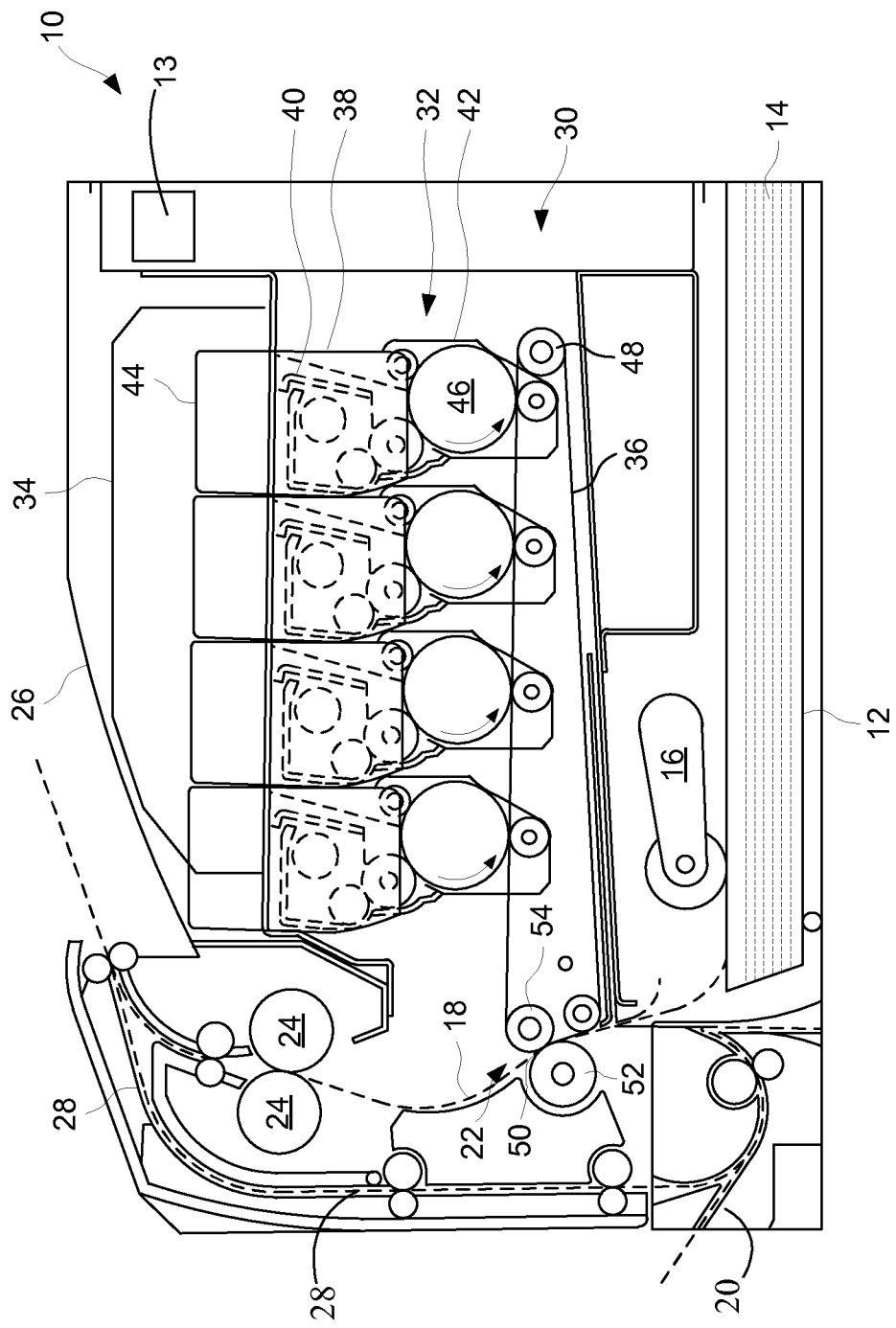
FIG. 1 is a cross sectional view of an electrophotographic imaging device having a scan unit printhead according to example embodiments of the present disclosure.

The following description and drawings illustrate embodiments sufficiently to enable those skilled in the art to practice the present invention. It is to be understood that the disclosure is not limited to the details of construction and the arrangement of components set forth in the following description or illustrated in the drawings. The invention is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some embodiments may be included in or substituted for those of others. The scope of the application encompasses the appended claims and all available equivalents. The following description is, therefore, not to be taken in a limited sense, and the scope of the present invention is defined by the appended claims.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Reference will now be made in detail to the exemplary embodiment(s) of the present disclosure, as illustrated in the accompanying drawings. Whenever possible, the same reference numerals will be used throughout the drawings to refer to the same or like parts.

One embodiment of an imaging apparatus 10 according to an example embodiment is illustrated in FIG. 1. Imaging apparatus 10 includes an input tray 12 sized to contain a stack of media sheets 14. A pick mechanism 16 is positioned adjacent the input tray 12 for moving a top-most sheet from the stack 14 and into a media path 18. Alternatively, the media sheets 14 may move into the media path 18 via a manual feed path 20. The media sheets 14 move from the input tray 12 along the media path 18 to a second transfer area 22. The media sheet 14 receives one or more toner images at second transfer area 22. The media sheet 14 with the toner images deposited thereon next moves through a fuser 24 to adhere the toner images to the media sheet 14. The media sheet 14 is then either discharged into an output tray 26 or moved into a duplex path 28 for forming a toner image on a second side of the media sheet 14.

An image formation area 30 of the imaging apparatus 10 includes an imaging unit 32, a laser printhead 34, and a transfer member 36. Imaging unit 32 includes one or more imaging stations 38 that each includes a developer unit 40, a photoconductor unit 42, and a toner cartridge 44. For clarity, the units 40, 42, and cartridge 44 are labeled on only one of the imaging stations 38 in FIG. 1. Developer unit 40, photoconductive unit 42 and toner cartridge 44 of each imaging station 38 may be separate units that are individually replaceable and insertable into imaging apparatus 10. Alternatively, developer unit 40 and photoconductive unit 42 may be combined into a single replaceable unit. In one embodiment, imaging apparatus 10 is a monochromatic imaging apparatus including a single imaging station 38 for forming toner images in a single color. In another embodiment, the imaging unit 32 includes multiple and separate imaging stations 38, each station being substantially the same except for the color of the toner associated therewith. In the embodiment illustrated in FIG. 1, the imaging unit 32 includes four imaging stations 38, and each of the imaging stations 38 includes the toner cartridge 44 having one of black, magenta, cyan, and yellow toner.

Laser printhead 34 includes at least one distinct laser diode for each imaging station 38 in imaging apparatus 10. The laser beam generated by the laser diode discharges a surface of a corresponding photoconductive (PC) member 46 of photoconductive unit 42. Toner from a developer unit 40 in the imaging station 38 is attracted to the surface area of the PC member 46 discharged by the laser beam from laser printhead 34 to form a toned image on PC member 46.

The transfer member 36 extends continuously around a series of rollers, including drive roller 48. Transfer member 36 receives the toner images from each of the PC members 46, referred to as a first toner transfer. In one embodiment, the toner images from PC members 46 are placed onto transfer member 36 in an overlapping arrangement. In one embodiment, a multi-color toner image is formed during a single pass of the transfer member 36. By way of example, the yellow toner may be placed first on the transfer member 36, followed in order by cyan, magenta, and black.

After receiving the toner images, transfer member 36 moves the images to the second transfer area 22 where the toner images are transferred to the media sheet 14. The second transfer area 22 includes a nip 50 formed by a transfer roller 52 and a backup roller 54. The media sheet 14 with the toner images next moves through the fuser 24 and is then discharged at the output tray 26 or moved into the duplex path 28, as mentioned above.

To effectuate imaging operations, a controller 13 manipulates and converts data defining each of the yellow, cyan, magenta and black image planes into separate corresponding laser pulse video signals, and the video signals are then communicated to printhead 34 (also referred to herein as a "laser scanning unit"). Controller 13 may also control other components and units of imaging apparatus 10 described above. Controller 13 may be implemented as a number of processors or controllers for controlling the operation of imaging apparatus 10.

Figure 2:
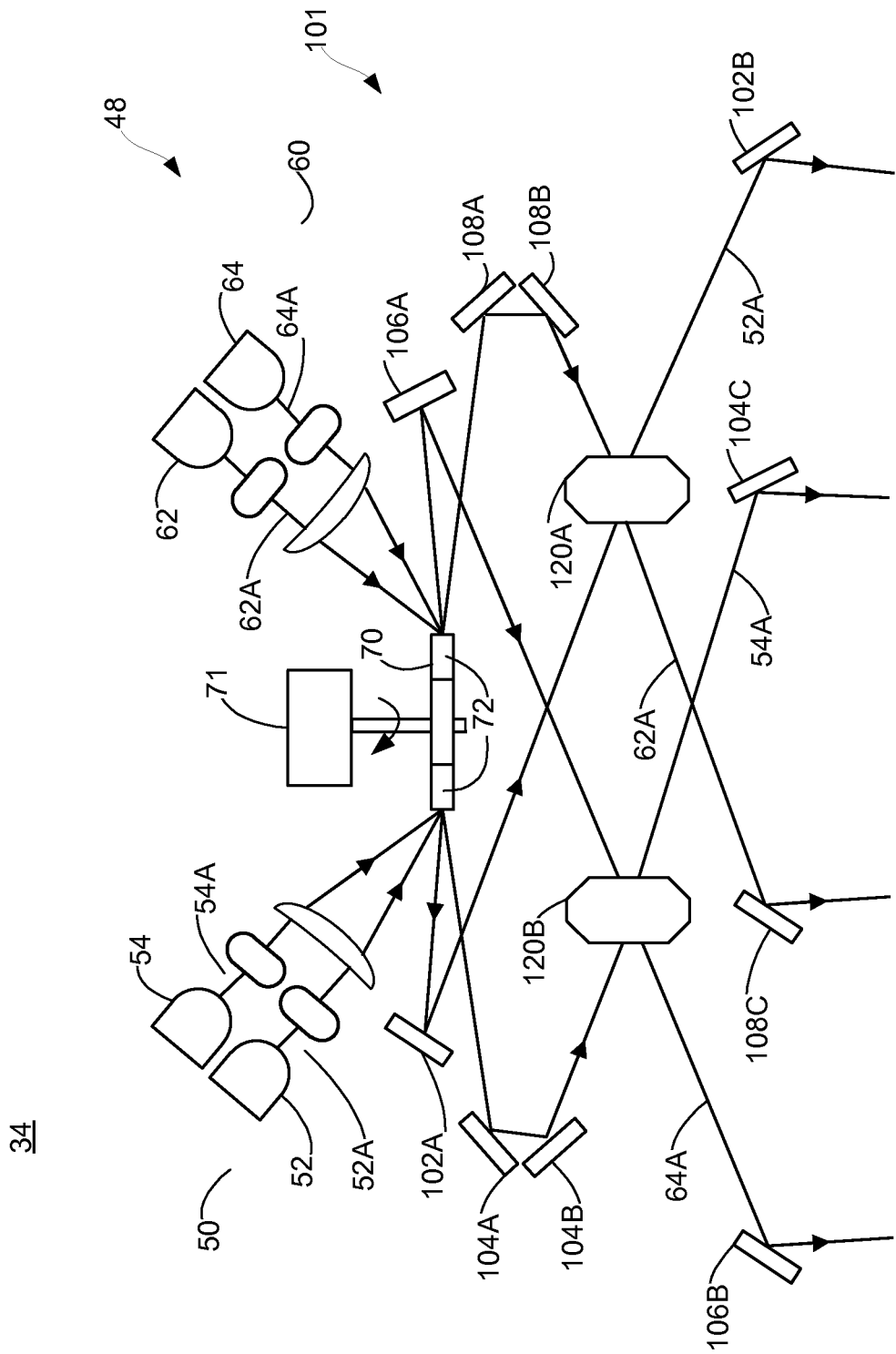
FIG. 2 is a simplified diagram illustrating the optical assemblies forming the optical paths of the scan unit printhead of FIG. 1.

With reference to FIG. 2, the printhead 34 may include a single rotatable polygonal mirror 70 that is powered by a motor 71, and a pre-scan optical assembly 48 including first and second pre-scan laser diode/lens assemblies 50 and 60. The rotatable polygonal mirror 70 is supported for rotation about a rotational axis and includes a plurality of facets 72. It is understood that mirrors other than a rotatable, polygonal mirror may be utilized in printhead 34. In an alternative embodiment, printhead 34 may include an oscillating mirror, such as a galvanometric mirror, instead of rotatable polygonal mirror 70.

The first pre-scan assembly 50 includes first and second laser diodes 52 and 54, each of which generates a corresponding laser beam 52A and 54A. The second pre-scan assembly 60 includes third and fourth laser diodes 62 and 64, each which generates a corresponding laser beam 62A and 64A. Each of pre-scan assemblies 50 and 60 may include one or more lenses, such as a collimation lens associated with each laser diode 52, 54, 62, and 64.

Each of the laser beams 52A, 54A, 62A, and 64A is modulated so as to write pixels or Pels according to an associated one of the video signals from the controller 13 as the beam move along a corresponding scan path. In particular, the first laser beam 52A is modulated according to a video signal corresponding to the cyan image plane. The second laser beam 54A is modulated according to a video signal corresponding to the magenta image plane. The third laser beam 62A is modulated according to a video signal corresponding to the black image plane. The fourth laser beam 64A is modulated according to a video signal corresponding to the yellow image plane.

Figure 3:
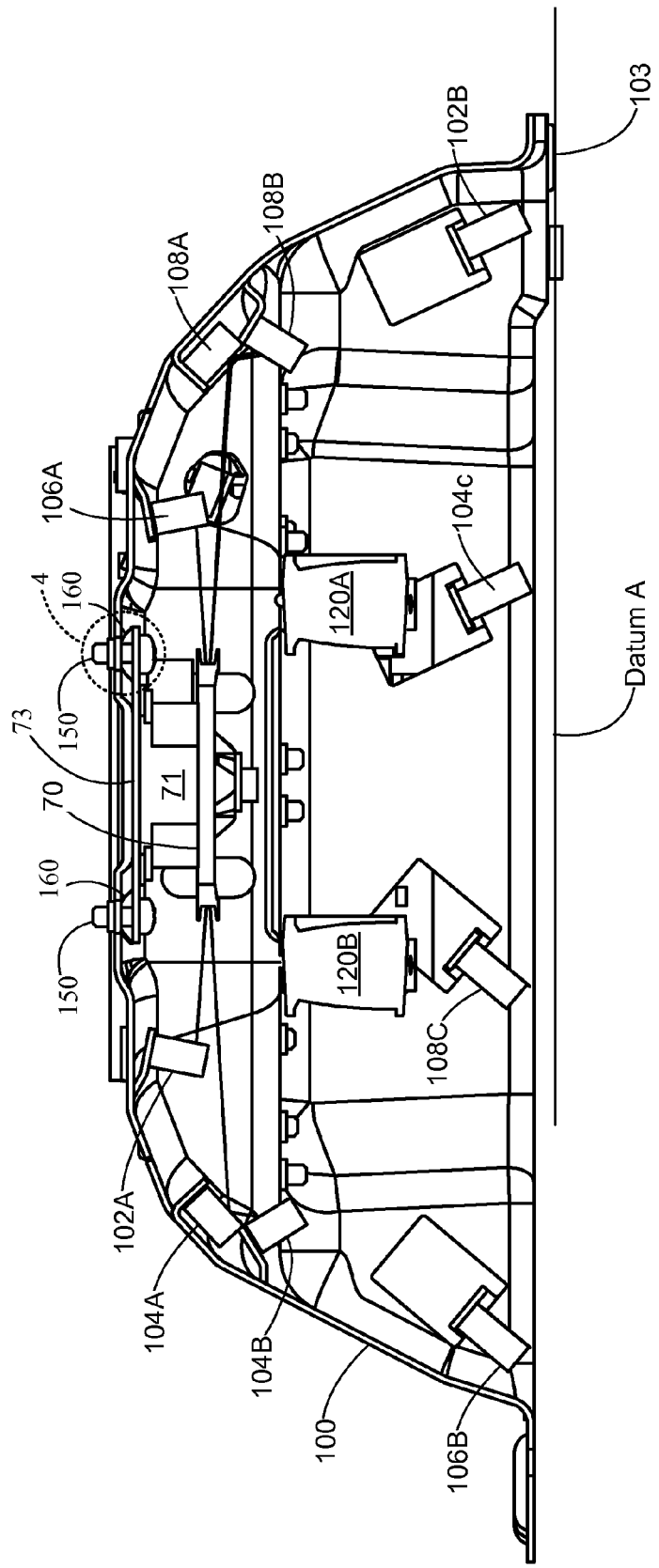
FIG. 3 is a cross sectional view of the scan unit printhead of FIGS. 1 and 2.

Each laser beam 52A, 54A, 62A, and 64A is reflected off the rotating polygonal minor 70 and is directed towards a corresponding one of the photoconductive drums 46 by select mirrors and lenses in a post-scan optical assembly 101, as shown in FIGS. 2 and 3. Beam 52A, after being reflected off the rotatable polygonal mirror 70, is reflected by reflection mirror 102A and passes through a first lens 120A and is then reflected by reflection mirror 102B before exiting printhead 34. The second beam 54A, after reflecting from rotatable polygonal mirror 70, is reflected by reflection mirrors 104A and 104B, passes through lens 120B, and is reflected by mirror 104C before exiting printhead 34. Third beam 62A, after being reflected by rotatable polygonal minor 70, is reflected by mirror 106A, passes through lens 120B and is reflected by mirror 106B before exiting printhead 34. Fourth beam 64A, after reflecting from rotatable polygonal mirror 70, is reflected by reflection mirrors 108A and 108B, passes through lens 120A, and is reflected by mirror 108C before exiting printhead 34.

The rotation of the rotatable polygonal mirror 70 and positioning of minors 102A-102B, 104A-104C, 106A-106B and 108A-108C and lenses 120A-120B of the post-scan optical assembly 101 causes each laser beam 52A, 54A, 62A and 64A to repeatedly sweep, along a corresponding scan path in the scan direction, across its corresponding photoconductive drum 46 so as to write Pels to form a latent image on the drum.

It is understood that pre-scan assemblies 50, 60 and post-scan assembly 101 may use a different number and/or arrangement of minors and lens in creating laser beams 52A, 54A, 62A and 64A that form scan patterns on photoconductive drums 46.

Printhead 34 includes a housing 100 in which pre-scan assemblies 50, 60 and post-scan assembly 101 are disposed. With reference to FIG. 3, housing 100 is substantially bowl shaped, having a convex outer surface and a concave inner surface to which components of assemblies 48 and 101 are connected. Housing 100 may have a substantially rectangular or square opening and four sides. It is understood that housing 100 may have a shape other than a bowl-shape having convex outer and concave inner surfaces. According to an example embodiment, housing 100 may have a more complex shape, such as having a substantially H-shaped cross section.

Housing 100 has a rigid structure in order to keep the components of pre-scan assemblies 50, 60 and post-scan assemblies 101 in proper alignment with each other. In accordance with example embodiments, housing 100 is constructed from a metal composition, such as steel. Further, housing 100 may be formed using a deep draw stamping process. Housing 100 may be formed from a sheet of metal having, for example, a thickness of about 1 mm, though it is understood that smaller housings 100, for example, may be constructed from sheet metal having smaller thicknesses.

A benefit of housing 100 being constructed from metal, such as steel, is that housing 100 has a much lower coefficient of thermal expansion (CTE) than the CTE of thermoplastic housings described above. In addition, the direction of the thermal expansion of housing 100 is much more uniform, thereby reducing housing warping and the adverse affect of warping to the alignment of components of pre-scan assemblies 50, 60 and post-scan assembly 101. Further, because metal has a higher thermal conductivity than plastic, heat generated near one portion of housing 100 will cause little if any variation of heat across housing 101, thereby reducing variations in thermal expansion across the housing.

Yet another benefit of usage of housing 100 and securing components of post-scan optical assembly 101 thereto using one or more adhesives is that without the need for bulky mounting hardware for the components, the outer size of housing 100 is reduced.

As mentioned above, housing 100 may be formed using a deep draw process. Housing 100 may be further strengthened by utilizing secondary processes of toxing or welding tabs of the sheet metal back to itself. This creates additional rigidity.

In an alternative embodiment, housing 100 may be machine or die-cast.

Motor 71 may include a base 73 (best seen in FIG. 6). In an example embodiment, base 73 may be a printed circuit board or other board having additional electrical components and/or circuitry mounted thereto for use in operating motor 71 during a printing operation. Motor 71 and base 73 may combine to form a motor assembly 74.

Motor 71 may be attached to housing 100 by directly mounting base 73 thereto. In particular, and with reference to FIGS. 3-6, fasteners 150 may be used to mount base 73 to housing 100. In an example embodiment, each fastener 150 may be a screw or bolt having a thread portion and head 151. Head 151 may be a pan head, for example. In addition, a plurality of spacers 160 may be provided between base 73 of motor assembly 74 and housing 100 to resiliently bias or urge the base 73 away from the housing 100. In an example embodiment, spacer 160 is a spring washer such as a wave washer or a cone-shaped washer, such as a Belleville washer. Alternatively, spacer 160 may be any suitable spring member such as, for example, a compression spring or a leaf spring. In another contemplated embodiment, spacer 160 may be formed from rubber of suitable Shore hardness.

Figure 5:
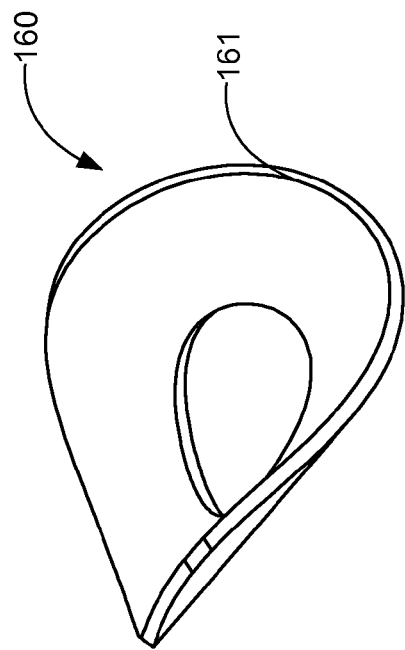
FIG. 5 is a perspective view of a washer of FIG. 4.
Figure 4:
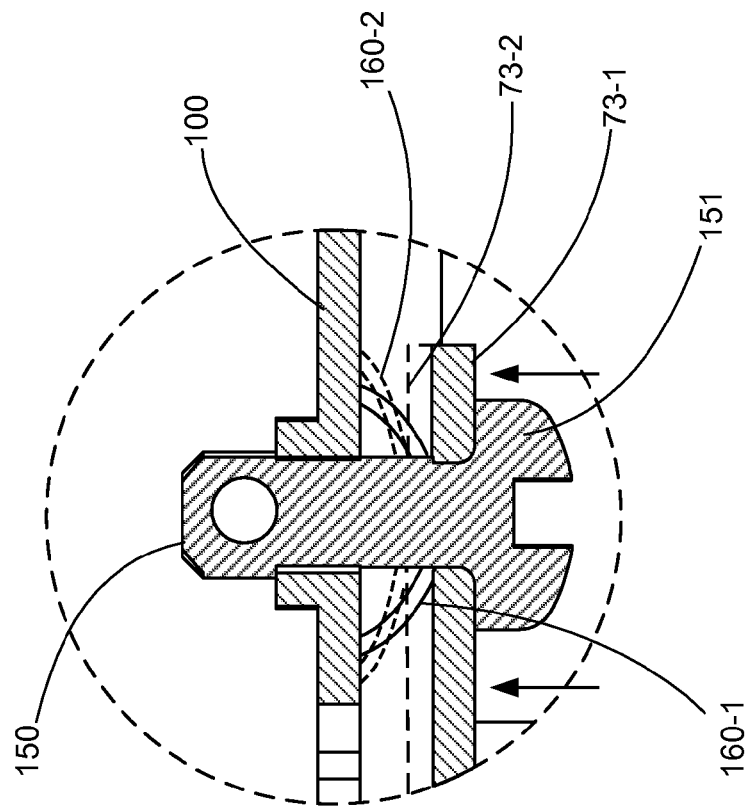
FIG. 4 is a magnified, partial cross sectional view of the scan unit printhead of FIG. 3 taken along the circle 4 therein.

In the example embodiment in which spacers 160 are wave washers, each spacer 160 has an annular shape and includes an outer edge 161 undulating in a circumferential direction, as shown in FIG. 5. In this embodiment, the amount of undulation may result in spacers 160 having a free height that is at least about 2.5 mm so that spacers 160 provide spacing between housing 100 and base 73 that is between about 1.3 mm and about 2.25 mm. It is understood, though, that the free height of spacers 160 and the spacing between housing 100 and base 73 may differ from the above dimensions.

As mentioned, spacers 160 bias base 73 of motor assembly 74 away from housing 100. In an example embodiment illustrated in FIG. 4, spacer 160 is positioned to have a portion of its outer edge 161 abutting against housing 100 and its inner portion abutting base 73. Mounted in this manner, spacer 160 may allow relative adjustment of a space between base 73 of motor assembly 74 and housing 100 during a tightening and loosening operation of at least one of the plurality of fasteners 150. During tightening of a fastener 150, fastener 150 overcomes the spring force of spacer 150 as head 151 of fastener 150 is moved closer to housing 100. As a result, spacer 160 deflects from an initial position 160-1 to a more compressed position 160-2, and base 73 moves from an initial position 73-1 to a second position 73-2 which is relatively closer to housing 100. Loosening is understood to occur in the reverse. Adjusting, i.e., tightening and/or loosening, each fastener 150 used to mount base 73 to housing 100 advantageously allows for base 73, and thus motor 70, to be substantially precisely adjusted relative to pre-scan assemblies 50, 60 and post-scan assembly 101.

In the example embodiment shown in FIG. 3, housing 100 may include a reference datum plane, Datum A, established by a plurality of planar features 103 formed on the housing 100. During mounting of motor 71 on housing 100, spacers 160 allow relative adjustment of fasteners 150 to adjust the position and planarity of rotating polygonal mirror 70 with respect to reference datum plane Datum A. In the example embodiment, spacers 160 may deflect up to about 1 mm and may permit a planarity tolerance limit with respect to the reference datum plane of between about 0.001 mm to about 0.05 mm.

Although FIGS. 3-6 show that motor 71 is mounted to housing 100 from the inside, in another contemplated embodiment, motor 71 may be mounted on the housing 100 from the outside wherein housing 100 may have a cut sized to fit through the motor 71.

The foregoing description of an embodiment has been presented for purposes of illustration. It is not intended to be exhaustive or to limit the application to the precise forms disclosed, and obviously many modifications and variations are possible in light of the above teaching. It is understood that the invention may be practiced in ways other than as specifically set forth herein without departing from the scope of the invention. It is intended that the scope of the application be defined by the claims appended hereto.

What is claimed is:

1. A scan unit for an imaging device, comprising:
   a housing to which a rotatable mirror, one or more light sources and an optical assembly are secured;
   a motor assembly including a motor for driving the rotatable minor, the motor assembly having a base;
   a plurality of fasteners for securing the base of the motor assembly to the housing; and
   a plurality of spacers interposed between the base of the motor assembly and the housing, the plurality of spacers resiliently biasing the base of the motor assembly away from the housing;
   wherein each of the plurality of spacers allows relative adjustment of a space between the base of the motor assembly and the housing during a tightening and loosening operation of at least one of the plurality of fasteners.

2. The scan unit of claim 1, further comprising a reference datum plane established by a plurality of planar features formed on the housing, wherein each of the plurality of spacers allows relative adjustment of each of the plurality of fasteners to adjust the planarity of a surface of the rotatable minor with respect to the reference datum plane.

3. The scan unit of claim 2, wherein the plurality of spacers allow a planarity tolerance limit with respect to the reference datum plane of between about 0.001 mm to about 0.05 mm.

4. The scan unit of claim 1, wherein each of the plurality of spacers has an annular shape and includes an outer edge undulating in a circumferential direction.

5. The scan unit of claim 1, wherein each of the plurality of spacers is a spring washer.

6. The scan unit of claim 5, wherein the spring washer is one of a Belleville washer and a wave washer.

7. The scan unit of claim 1, wherein the housing comprises a metal housing.

8. The scan unit of claim 7, wherein the metal housing is a drawn metal housing.

9. The scan unit of claim 1, wherein each of the plurality of fasteners is a threaded fastener.

10. An imaging device, comprising:
    a scan unit, comprising:
       a mirror movable about an axis;
       a motor assembly for driving the mirror, the motor assembly having a motor and a base;
       at least one light source, a light beam generated by each light source being directed towards the mirror such that movement of the mirror causes each light beam that is reflected by the mirror to follow a distinct scan pattern;
       an optical assembly associated with each reflected light beam and forming an optical path for the reflected light beam from the housing, the optical assembly including at least one mirror and at least one lens;
       a housing to which the mirror, the at least one light source and the optical assembly are secured;
       a plurality of fasteners for securing the base of the motor assembly to the housing; and
       a plurality of spring washers interposed between the base of the motor assembly and the housing, the plurality of spring washers resiliently biasing the base away from the housing;
    wherein each of the plurality of spring washers allows relative adjustment of a space between the base of the motor assembly and the housing during a tightening and loosening operation of at least one of the plurality of fasteners.

11. The imaging device of claim 10, further comprising a reference datum plane established by a plurality of planar features formed on the housing, wherein each of the plurality of spring washers allows relative adjustment of each of the plurality of fasteners to adjust the planarity of a surface of the mirror with respect to the reference datum plane.

12. The imaging device of claim 11, wherein the plurality of spring washers allow a planarity tolerance limit with respect to the reference datum plane of between about 0.001 mm to about 0.05 mm.

13. The imaging device of claim 10, wherein each of the plurality of spring washers has an annular shape and includes an outer edge undulating in a circumferential direction.

14. The imaging device of claim 10, wherein each of the plurality of spring washers is one of a Belleville washer and a wave washer.

15. The imaging device of claim 10, wherein the housing comprises a metal housing.

16. The imaging device of claim 15, wherein the metal housing is a drawn metal housing.

17. The imaging device of claim 10, wherein each of the plurality of fasteners is a threaded fastener.

* * * * *